United States Patent [19]
Toulis et al.

[11] 3,854,116
[45] Dec. 10, 1974

[54] UNDERWATER SOUND DETECTION

[75] Inventors: William J. Toulis, Columbus, Ohio; Douglas A. King, Corona, Calif.

[73] Assignee: Rockwell International Corporation, El Segundo, Calif.

[22] Filed: Aug. 24, 1966

[21] Appl. No.: 574,748

[52] U.S. Cl. ............................... 340/8 L, 181/.5 A
[51] Int. Cl. ............................................ G10k 11/06
[58] Field of Search ........... 340/5, 6, 8, 8 L; 181/.5, 181/.5 A

[56] References Cited
UNITED STATES PATENTS
| | | | |
|---|---|---|---|
| 3,017,608 | 1/1962 | Toulis | 340/5 |
| 3,021,504 | 2/1962 | Toulis | 340/5 |

*Primary Examiner*—Richard A. Farley
*Attorney, Agent, or Firm*—L. Lee Humphries

EXEMPLARY CLAIM

1. Apparatus for focusing acoustic energy at an underwater operating depth, and comprising:
   a. A collapsible array of gas-receiving compliant tube elements arranged in an approximate Luneberg-type distribution and fabricated of a material having a stiffness less than the stiffness of the gas to be received therein at the apparatus underwater operating depth,
   b. A supply of pressurized gas separate from said collapsible array, and
   c. Means for flowing gas from said gas supply to said compliant tube elements for array inflation at a pressure just slightly greater than the pressure corresponding to the apparatus underwater operating depth, said collapsible array being comprised of uniformly spaced-apart planar sub-arrays of joined concentric tube elements of circular plan when expanded from a collapsed condition and inflated to an operating condition.

3 Claims, 10 Drawing Figures

PATENTED DEC 10 1974
3,854,116
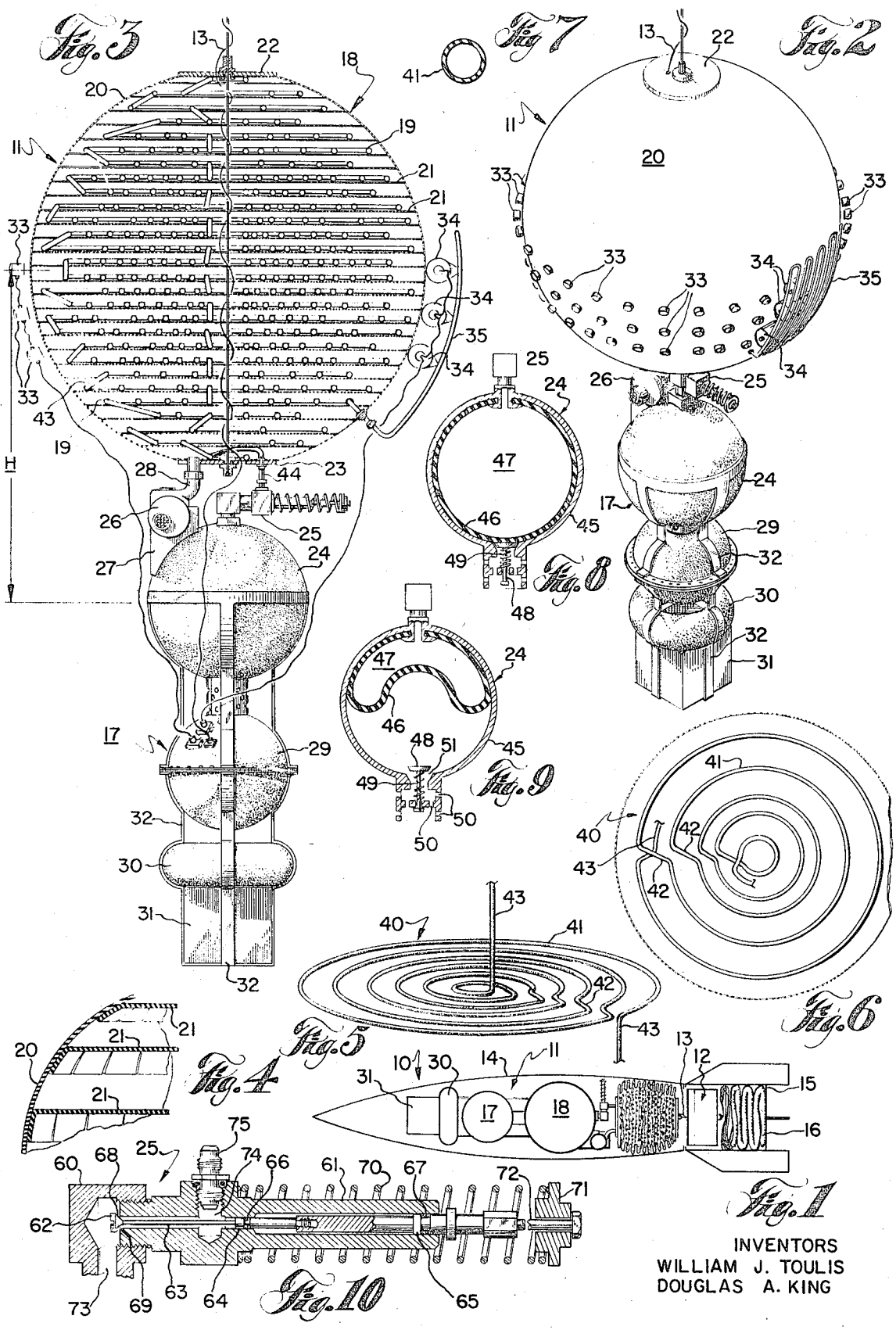
INVENTORS
WILLIAM J. TOULIS
DOUGLAS A. KING

UNDERWATER SOUND DETECTION This invention concerns underwater sound detection systems and specifically relates to both apparatus and method of deployment aspects of a novel acoustic lens that may be integrated into an aircraft or ship-delivered underwater sound detection system in a desired compact manner and that functions to focus received underwater acoustic signals with minimum signal attenuation and minimum signal aberration after effective deployment.

Known equipment utilized in detecting signals propagated under water throughout appreciable distance ranges is generally required to intercept acoustic energy from over an energy front of considerable spatial or area extent in order to obtain useful detection information. Such apparatus has been, because of size considerations, difficult to deliver and deploy in an optimum manner using conventional vehicles. Aircraft or ship delivery and subsequent deployment of underwater sound detection systems without a reduction of acoustic detection capability may now be achieved in a more effective manner through practice of the novel lens apparatus and deployment method steps of this invention.

This invention makes use of an energy-focusing, collapsible, generally-spherical, Luneberg-type compliant tube array lens properly positioned and deployed by a cooperating collapsible support also of generally spherical extent. Both apparatus items are collapsed prior to system delivery and are afterwards extended to accomplish lens deployment and activation. The spherical array is comprised of joined planar concentric compliant tube sub-arrays fabricated of a rubber-like material with a circular, thin-walled cross-section and inflated with pressurized gas such as hydrogen, helium, nitrogen, or the like to just above the environmental pressure of the lens apparatus underwater operating depth. Normally, the underwater sound detection system incorporating the improved lens apparatus is delivered by aircraft to the site of operation and is permitted to descend to a preselected depth prior to actuation of the spherical support and cooperating compliant tube array for system operation.

An important object of this invention is to provide an underwater sound detection system with acoustic lens apparatus that may be collapsed and contained within a minimum volume for delivery by aircraft to a location for operational deployment.

Another object of this invention is to provide an underwater sound detection system with acoustic lens apparatus that may be deployed in a highly effective manner into a fully operable condition subsequent to delivery by aircraft to an operating location.

A still further object of this invention is to provide an underwater sound detection system with acoustic lens apparatus that functions to receive acoustic energy from over a comparatively extended energy front when deployed and that operates to focus such energy at a predetermined point with minimum attenuation and minimum aberration.

Other objects and advantages of this invention will become apparent from a consideration of the following description and drawings.

In the drawings:

FIG. 1 is a schematic sectional view of an underwater sound detection system intended for delivery and deployment by aircraft or ship and having the acoustic lens apparatus of this invention incorporated therein;

FIG. 2 is a perspective view of the acoustic section portion of the FIG. 1 system showing the lens apparatus of this invention incorporated therein but in a fully deployed condition;

FIG. 3 is an elevational view similar to FIG. 2 but showing portions of the lens apparatus of this invention in section;

FIG. 4 is a partial sectional view showing construction details of the spherical shell support included in the lens apparatus of FIGS. 1 through 3;

FIG. 5 is a perspective view of a representative planar sub-array in the spherical compliant tube array illustrated in FIG. 3;

FIG. 6 is a plan view of the array portion shown in FIG. 5;

FIG. 7 is a sectional view of the compliant tube illustrated in FIGS. 3, 5, and 6;

FIGS. 8 and 9 are elevational sectional views of a preferred form of gas supply utilized in the lens apparatus arrangement of FIGS. 1 through 3; and FIG. 10 is a sectional view of a preferred gas supply valve utilized in connection with the lens apparatus of FIGS. 1 through 3.

An aircraft-delivered underwater sound system incorporating the acoustic lens apparatus of this invention is referenced generally as 10 in FIG. 1 of the drawings. Such system, depending upon particular design features, may operate in either a passive mode or an active mode, or both, and is normally comprised of an acoustics section 11 operationally connected to telemetry buoy section 12 by signal-transmitting cable 13. Acoustic signals received and detected by acoustics section 11 are normally processed into a useful information form by included signal processor equipment and are conducted to section 12 for transmission by conventional telemetry radio to monitoring aircraft and the like. Separate fairings 14 and 15 are provided for sections 11 and 12 in the customary manner. The novel acoustic lens apparatus 18 of this invention is integrated into the FIG. 1 arrangement in a compact manner and requires a minimum volume for pre-deployment installation. Means for launching the delivery of system 10 from an aircraft, as by parachute 16, and means for separating sections 11 and 12 on engagement with the surface of the water are not critical to this invention and therefore are not shown in the drawings in detail. Similarly, means for separating fairing 14 from its interiorly contained acoustics equipment at the system operating depth and means for mooring acoustics section 11 in operating position are of a conventional nature. In some forms of system 10 signal transmission from acoustics section 11 to the surface-positioned telemetry buoy section 12 may be by other means than signal cable 13.

As shown in FIGS. 2 and 3, acoustics section 11 is comprised of the signal processor assembly designated 17 and the novel acoustic lens apparatus 18 of this invention. Assembly 18 includes a compliant tube array 19 located interiorly of and is essentially deployed and positioned properly by inflated collapsible shell support member 20 having a generally spherical configuration. Individual shelves 21, each essentially of planar and circular form, are secured to the interior surface of shell member 20 and oriented normal to the polar axis of array 19. Such polar axis corresponds to the position of the portion of cable 13 shown in FIG. 3. An upper polar plate 22 and a lower polar plate 23 serve to close out the shell interior. Plates 22 and 23 also serve as attach points for cable 13; plate 23 secures shell 20 and all interiorly positioned components relative to the other major components of assembly 18. A gas supply container 24 is positioned below compliant tube array 19 by a distance corresponding to the center-to-center distance designated H in the drawings. A gas supply valve 25 is operably connected to gas supply 24 and functions to valve pressurized gas into the inlet of compliant tube array 19 when the assembly has been submerged to a preselected operating depth. A conventional pump means 26, preferably of an electrically driven type, is mounted on the support 27 secured to gas supply container 24. Pump 26 functions to port environmental water at a slightly increased pressure into conduit 28 and in turn into the closed interior of shell 20 to accomplish shell inflation and consequent lens compliant tube deployment.

Signal processor assembly 17, although not a critical part of this invention, is important relative to the normal operation of a complete underwater sound detection system. The elements included therein are of conventional form and generally include electronics sections contained in sealed housings 29 and 30 for processing signals associated with the system's various modes of operation and a cooperating power supply 31 normally in the form of a conventional storage battery. Structural members 32 serve to connect the major support components of assemblies 17 and 18 in fixed position relative to each other.

Conventional transducer devices 33 and 34 are positioned at the surface of spherical shell support member 20 and function to respectively detect and radiate acoustic energy. Such transducer devices are considered to comprise a portion of the electronics sections contained in housings 29 and 30 of assembly 17. Elements 33 and 34 do not function to focus or control the radiation of acoustic energy even though secured to the shell portion of lens assembly 18. Transducer devices 33 are preferably directional hydrophones positioned to be sensitive essentially only to sound energy focused by the compliant tube array; transducer devices 34, on the other hand, normally are piezoceramic units having an appreciably larger power rating as required for launching a highly directional beam of acoustic energy in connection with an active mode of operation for system 10. The system embodiment shown in the drawings does not include means for acoustic section rotation relative to a fixed reference orientation to resolve the directionality of either received or launched signals. Accordingly, numerous receiving transducers 33 are positioned at the surface of shell 20 in spaced-apart relation about the entire shell perimeter. The degree of separation required between adjacent individual transducers 33 is determined in a conventional manner by the degree of received signal directional resolution that is desired. Similarly, transducer devices 33 are arranged vertically in rows to provide a capability for additionally resolving received signals as to directional elevation. The number of rows (lines of latitude) of transducer devices 33 and the desired latitude separation between adjacent rows is selected in a conventional manner. In instances wherein acoustics section 11 is provided with rotating means for establishing an active mode operational capability or for establishing a directionality resolution capability, significantly fewer transducers 33 are required for optimum system performance. An inflatable reflector 35 comprised of compliant tubing is also positioned in fixed relation to the exterior surface of shell 20 to avoid loss of radiating transducer energy by re-directing it into the lens. Reflector 35 may be connected to the manifold for compliant tubing array 19 to establish a source of pressurized gas for reflector deployment. Although not shown in the drawings, transducer devices 33 and 34 may be secured to shell 20 in any conventional manner as by insertion in pockets attached to the shell surface and fabricated of the same film material. The components of system 10 included in signal processor 17 are selected, installed, and operated in manners that are considered within the state of the art. However, additional description is provided with respect to the important characteristics of those system components which comprise the novel acoustic lens apparatus 18 of this invention.

Compliant tube array 19 is generally spherical in its overall configuration and functions to cause the refraction and focusing of incident acoustical energy substantially in accordance with the phenomena and theories discussed in the technical paper entitled "Acoustic Focusing With Spherical Structures" and published in "The Journal of the Acoustical Society of America," Volume 35, No. 3, Pages 286–295, March 1963. The construction of array 19 differs in at least two important aspects, however, from the spherical focusing apparatus described in such paper. First, the instant acoustic lens apparatus utilizes compliant tube elements that are fabricated of a rubber-like circularly cross-sectioned hollow tubing and that contain gas at a pressure level greater than the pressure of the environmental fluid rather than compliant tubes that are metallic and fabricated with an elliptical cross-section and that contain gas with an internal pressure less than the environmental fluid medium. Second, the compliant tube elements of array 19 are transposed from their theoretically desired concentric spherical shell positions into an arrangement of planar sub-arrays 40 oriented normal to the apparatus polar axis rather than into a series of concentric cylindrical sub-arrays. Such transposition or re-positioning is important with respect to ease of fabrication and deployment objectives associated with the instant invention. In accomplishing the re-positioning care should be taken that the average of all deviations between the theoretically desired tube positions and the associated adjacent planar positions is essentially zero and that such deviations be dispersed randomly if optimum lens performance is required.

FIG. 5 of the drawings illustrates a representative planar sub-array 40. As shown therein, the preferred embodiment of apparatus 19 is a continuous compliant tube 41 rather than a combination of concentric circular compliant tubes of different diameter connected by a suitable manifold arrangement. As shown in FIG. 5, an offset portion 42 is provided to interconnect adjacent concentric portions of the compliant tube sub-array. Also, riser portions 43 are provided at the radial extremes of each sub-array 40 in spherical array 19. Uniform spacing as between adjacent sub-arrays 40, and substantially throughout the polar extent of spherical array 19, is preferred for most applications of the instant invention. As shown by FIG. 7, compliant tube element 41 is provided with a circular cross-section and also preferably with a relatively thin wall. The instant invention also preferably utilizes a compliant tube element (or elements) fabricated of a material having a low stiffness in comparison with the stiffness of the enclosed gas; gum rubber is generally a satisfactory material for most tubing applications. The tube material should also be impermeable to the gas supplied from gas supply 24 and at the pressure differentials normally encountered as between the supplied gas and the fluid environment of deployed acoustic section 11 of underwater detection system 10.

Spherical shell member 20 and internally located shelves 21 are essentially provided for the purpose of properly positioning and deploying the compliant tube elements and sub-arrays constituting array 19. Shell 20 and shelves 21 are preferably fabricated of a thin acoustically-transparent material such as a polyester film, film laminate, or coated fabric. The shell material is preferably impermeable to environmental fluid and should be selected with a tensile strength and proper thickness to withstand a moderate degree of internal pressurization relative to the pressure of the environmental fluid. In constructing shell 20, the assembly may be made up of separately joined hemispherical sections fashioned of gore elements, fabrication may be by heat-sealing at seam regions or by an equivalent technique. Although not shown in the drawings, the lower extreme of spherical shell 20 is preferably provided with a relief plug that opens when the shell interior is flooded with a fluid less dense than the lens environmental fluid to a pressure condition associated with buoyancy. It is contemplated that acoustics section 11 of system 10 be recovered after operational use by porting an expandable gas into the interior of shell 20 to cause the assembly to surface.

Shelves 21 are preferably fabricated of the same material as spherical shell 20. Such are provided with interior openings (as in the case of the openings surrounding cable 13, FIG. 3) whereby environmental fluid ported into the shell interior by pump means 26 is caused to be flooded throughout the shell interior and thereby completely deploy compliant tube array 19. Any conventional means such as ties, slit openings, or the like may be utilized to secure the concentric elements of compliant tube 41 to a proper position on each associated shelf 21 for sub-arrays 40.

The gas supply 24 utilized in acoustics section 18 is normally contained by pressure container 45 having a flexible, diaphragm-like pressure barrier 46 located therein. The gas 47 utilized for activation of array 19 is contained interiorly of bladder 46 and may be hydrogen, helium, nitrogen, or the like. A poppet member 48 urged upwardly by spring 49 functions at a preselected underwater depth to permit environmental fluid to be ported through passageways 50 and 51 into the interior region located intermediate pressure shell 45 and bladder 46. The correspondingly pressurized gas 47 is afterwards ported from the interior of bladder 46 and into manifold 44 for compliant tube array 19 by means of gas valve 25. FIG. 8 illustrates supply 24 in a charged condition prior to deployment at a preselected underwater operating depth; FIG. 9 shows the same unit at the desired operating depth of acoustics section 11. Gas supply arrangements other than the means designated 24 in the drawings may be utilized in the practice of this invention, if desired.

One suitable form of valve assembly 25 for underwater detection system 10 is illustrated in cross-section in FIG. 10. As shown therein, assembly 25 is basically comprised of body sections 60 and 61 and an included valve member 62 having a stem portion 63 and joined piston portions 64 and 65. Each piston portion is provided with a seal means 66 or 67 to prevent the leakage of environmental fluid into the valve interior. Valve member 62 is also provided with a valve face 68 on stem 63 that cooperates with a valve seat 69 in lip form in body portion 61. A compression spring 70 cooperates with body portion 61 at one extreme and with an adaptor 71 at its other extreme to place valve member 62 in tension and cause valve face 68 to bear against valve seat 69. A length-compensating means 72 is provided in stem 63 to permit adjustment of the bias established for spring means 70. In designing valve assembly 25, it is preferred that the effective area of valve seat 69 be significantly less than the cross-sectional area of valve piston 65 and that the cross-sectional area of valve piston 64 be significantly less than that of valve seat 69. The proportions between the effective areas of valve seat 69 and piston portions 64 and 65 are selected so that the bias of spring 70 is balanced at a system deployment depth having a pressure corresponding to the desired system operating pressure thereby releasing valve face 68 from compression against valve seat 69. Pressurized gas from within inflation bladder 46 is ported through passageway 73 and into passageway 74 at the preselected depth and causes the net force acting with spring 70 to be further reduced thus permitting valve member 62 to be moved to a more completely opened condition by the environmental pressure. Gas ported from supply 24 through passageways 73 and 74 pass through fitting 75 and into the manifold 44 of compliant tube array 19.

The features of this invention have been utilized in connection with the design of an underwater sound detection system acoustics section 18 for operation at an underwater depth of approximately 15,000 feet to detect acoustic signals in a frequency band extending approximately from 4,000 to 6,000 cycles per second. The acoustics section 18 included an equitorial array of transducer devices 33 having a nominal array diameter of 60 inches. The included compliant tube array 19 was comprised of twenty-eight (28) sub-arrays 40 spaced approximately 2 inches apart uniformly throughout the polar extent of the lens spherical configuration. The compliant tube 41 was fabricated of soft rubber and had a hollow circular cross-section of five-sixteenths inch internal diameter and one thirty-second inch wall thickness. The gas utilized to activate array 19 was helium and the design pressure differential at operating depth between the tube interior and environmental fluid flooded in the interior of shell 20 was in the range of 2 to 5 psi. The preferred azimuth angular displacement between adjacent transducer devices 33 was approximately 12° for proper directional resolution of received signals.

In the normal mode of operation, underwater detection system 10 is delivered in its FIG. 1 assembled condition by aircraft to a preselected site and dropped to the ocean surface. Section 11 is detached from section 12 and descends to the desired operating depth. During the descent and at a depth having an environmental fluid pressure level corresponding to the charged pressure of the gas contained in gas supply 24, valve member 48 is opened to admit the environmental fluid to the interior of container 45. Such valve opening preferably occurs at a depth close to but above the desired operating depth for assembly 18. At the desired operating depth, e.g., 15,000 feet, the unbalanced force acting on valve member 63 by virtue of the fluid pressure acting on the unequal cross-sectional areas of piston 65 and valve face 68 overcomes the bias of spring 70 to permit pressurized gas from gas supply 24 to be ported into manifold 44. At the desired operating depth pump means 26 is energized by a depth sensing device (not shown) and ports environmental fluid into the interior of shell 20 at a moderate to slight pressure head, e.g., 5 psi. When shell 20 is fully inflated to properly deploy shelves 21 and the attached compliant tubing 41 of array 19, the system may be operated for underwater sound detection purposes in any conventional manner.

It is to be understood that the forms of the invention herewith shown and described are to be taken as preferred embodiments of the same, but that various changes in the proportioning, size, and detail of parts may be resorted to without departing from the spirit of the invention or the scope of the subjoined claims.

We claim:

1. Apparatus for focusing acoustic energy at an underwater operating depth, and comprising:

a. A collapsible array of gas-receiving compliant tube elements arranged in an approximate Luneberg-type distribution and fabricated of a material having a stiffness less than the stiffness of the gas to be received therein at the apparatus underwater operating depth,
   b. A supply of pressurized gas separate from said collapsible array, and
   c. Means for flowing gas from said gas supply to said compliant tube elements for array inflation at a pressure just slightly greater than the pressure corresponding to the apparatus underwater operating depth, said collapsible array being comprised of uniformly spaced-apart planar sub-arrays of joined concentric tube elements of circular plan when expanded from a collapsed condition and inflated to an operating condition.

2. The apparatus defined by claim 1, wherein said compliant tube element material is gum rubber having a thin-walled circular cross-section.

3. The apparatus defined by claim 1, wherein said array inflation pressure is approximately 5 psi greater than the pressure corresponding to the apparatus underwater operating depth.

* * * * *